June 25, 1935.    L. L. BASSETT    2,006,293
HANDLE FOR CANS
Filed Aug. 23, 1934
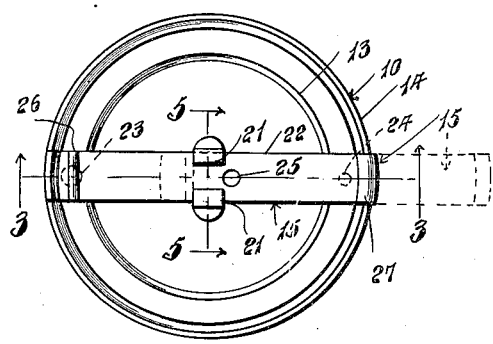
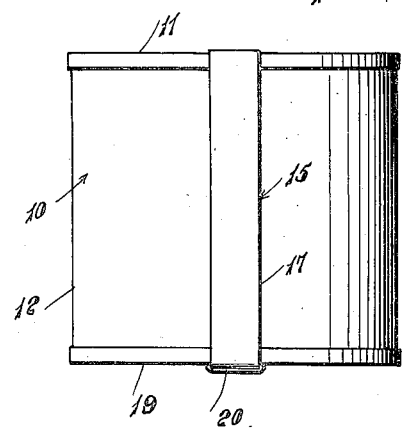
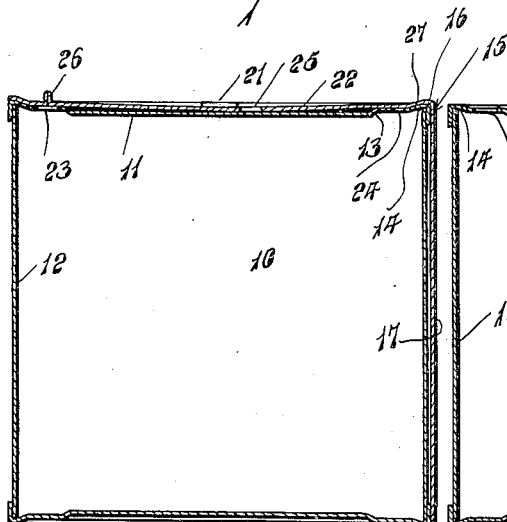
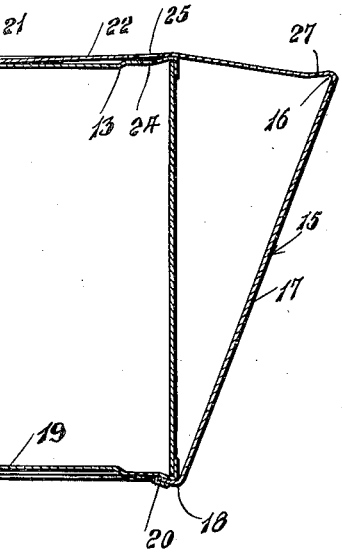
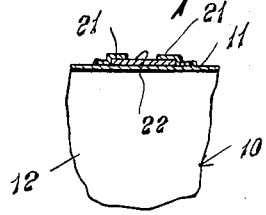
Inventor
Lloyd L. Bassett.
By
Attorney Patented June 25, 1935

2,006,293

UNITED STATES PATENT OFFICE 2,006,293

HANDLE FOR CANS

Lloyd L. Bassett, Los Angeles, Calif.

Application August 23, 1934, Serial No. 741,171

4 Claims. (Cl. 220—94)

The invention relates to a handle for cans containing condensed milk and cream, syrup, molasses, and other fluent products, and has for its object the provision of a handle that is adapted to be secured to the can at the cannery and provides means for conveniently handling the can in dispensing its contents through the usual openings provided for dispensing the material and venting the can when the handle is in extended position, and when in a collapsed position serving to adequately close the openings in the can to prevent entrance of foreign matter therein.

A further object of the invention is the provision of a handle of the character stated that is reasonable in cost of manufacture and installation on the can, and that will add to the merchandising attractiveness of the article because of its simplicity and utility.

The invention will be described in detail hereinafter and will be found illustrated in the accompanying drawing, in which Figure 1 is a top plan view of a can showing the improved handle applied thereto, the handle being shown in its inutile position in full lines and in its utile position in broken lines, Figure 2 is a side view in elevation of the can and handle, Figure 3 is a transverse sectional view on a plane indicated by the line 3—3 of Figure 1 showing the handle in inutile position, Figure 4 is a similar view on the same plane showing the handle in its utile position, and Figure 5 is a sectional detail on a plane indicated by the line 5—5 of Figure 1.

In the drawing similar reference characters are used to designate corresponding parts in all the views.

The can 10 shown in the drawing is one type of sheet metal can used for merchandising fluent materials such as condensed milk or cream, syrup, molasses, and the like, and has a top 11 that is secured to the side walls 12 and depressed as shown at 13 adjacent to its circumferential edge, to provide a ridge or bead 14 circumferentially of the can.

A handle member 15 is made preferably of sheet metal and bent at substantially right angles intermediate of its ends as shown at 16, one portion of said handle 17, when the handle is in inutile position being adjacent to the side wall 12, and has its end bent under the lower portion of the can as shown at 18 and secured to the bottom 19 of the can by means of solder or otherwise as shown at 20.

The other portion of the handle member 15 is slidably mounted on the top 13 by means of clips 21, said clips being soldered or otherwise secured to the can top and bent to engage the portion 22 of the handle member and hold it for slidable movement relatively to the can top.

It is customary in dispensing fluent material from cans to make two openings in the top at diametrically opposite sides thereof, and in the drawing these openings are indicated at 23 and 24, the opening 23 permitting pouring of the contents from the can, while the opening 24 is provided to vent the interior of the can. When in inutile position as shown in Figures 1 and 3, the portion 22 of the handle covers the openings 23 and 24 to prevent contamination of the contents of the can, and when the handle is moved into the position shown in broken lines in Figure 1 and Figure 4 the opening 23 is exposed by removal of the end of the portion 22 of the handle, and the handle is provided with an opening 25 that alines with the opening 24. Adjacent to the free end of the portion 22 is an upright flange 26 for convenience in sliding the handle on the top, and also provides a stop by engaging the clips 21 to limit the movement of the handle into utile position as best shown in Figure 4.

The portion of the handle 22 adjacent to the angle 16 is provided with an offset portion 27 that when the handle is in the position shown in Figures 1 and 3 engages the bead or ridge 14 and provides means for preventing casual movement of the handle to utile position during shipment and storage of the can.

In use the can is shipped hermetically sealed, and to dispense the contents of the can the handle is moved into utile position as shown in Figure 4, and the openings 23 and 24 are then made, the instrument used for making the opening 24 being applied through the opening 25. The article is then in condition for use, and after the contents have been partially dispensed the handle is moved to its inutile position as shown in Figure 3, the openings 23 and 24 in the can will be closed by the handle to prevent the entrance of foreign material into the can.

What I claim as my invention is:—

1. In combination with a can, a handle member of flexible material having one of its ends secured to the lower portion of the can, and its other end slidably mounted on the top of the can, means secured to the can top to guide the slidable end of the handle, the can top adapted to have openings punched therein to dispense the contents of the can and to vent it, the slidable end of the handle closing said openings in one position and exposing the dispensing opening in a second position, and the slidable end of the handle provided with an opening alining with the vent opening in said second position.

2. In combination with a can, a handle member of sheet metal having one of its ends secured to the lower portion of the can, and its other end slidably mounted on the can top and in one position extending diametrically across said can top to cover openings made in the top for dispensing material in the can, clips secured to the can top and engaging the handle member, an upstanding flange on the handle member for manually moving it and engaging said clips in one position of the handle member to limit its movement in one direction, and the handle member provided with an opening to register with one of the openings in the can top in one of its positions.

3. In combination with a can, a handle member of sheet metal bent intermediate of its ends into substantially right angled form, one side of said angular handle normally lying against a side of the can and having its end secured thereto adjacent to the bottom of the can, its other side slidably engaging the can top and normally closing openings in said top for dispensing the can contents and venting the interior of the can, the dispensing opening being exposed when the handle member is moved on the top, the handle member being provided with an opening to register with the vent opening when so moved, clips secured to the top and slidably mounting the handle, and an upstanding flange on the handle for manually moving it and in one position engaging the clips to limit the movement thereof.

4. In combination with a can having side wall, and a top depressed below the upper end of the side wall providing a raised bead, a handle member comprising a strip of sheet metal bent intermediate of its ends into substantially a right angle, one end of said strip normally engaging the side wall and having its end secured adjacent to the bottom of the wall, the other end of the strip slidably mounted on the top and movable in one direction to provide with the other end a handle, and the strip of metal offset adjacent to the bend to engage said bead and hold the handle in inutile position.

LLOYD L. BASSETT.